M. J. SVEHLA.
GAME TRAP.
APPLICATION FILED NOV. 22, 1920.

1,421,610.

Patented July 4, 1922.
2 SHEETS—SHEET 1.

Inventor:
Martin J. Svehla.
By Fred'k J. Marson,
Attorney.

M. J. SVEHLA.
GAME TRAP.
APPLICATION FILED NOV. 22, 1920.

1,421,610.

Patented July 4, 1922.

Inventor:
Martin J. Svehla.
By,
Attorney.

UNITED STATES PATENT OFFICE.

MARTIN J. SVEHLA, OF SUTHERLAND, IOWA.

GAME TRAP.

1,421,610. Specification of Letters Patent. Patented July 4, 1922.

Application filed November 22, 1920. Serial No. 425,704.

*To all whom it may concern:*

Be it known that I, MARTIN J. SVEHLA, a citizen of the United States, residing at Sutherland, in the county of O'Brien and State of Iowa, have invented certain new and useful Improvements in Game Traps, of which the following is a specification.

My invention relates to improvements in game traps, and more particularly to a trap for trapping fox, coon, possum, skunk and like animals, and has for its object to provide a trap, the jaws of which are closed by the action of a coiled spring after pressure has been exerted upon the bait treadle.

A further object of the invention is to provide novel means for normally retaining the trap in its set position.

A further object of the invention is to provide convenient means for setting the trap.

A still further object of the invention is to provide a game trap which will be simple and inexpensive in construction, and one which will be highly effective for the purposes intended.

With these objects in view, the invention consists in the novel features of construction, arrangement and combination of parts hereinafter more fully described and finally pointed out in the claims hereto appended.

Referring to the accompanying drawings forming a part of this specification, wherein like characters of reference denote similar parts throughout the several views.

Figure 1:
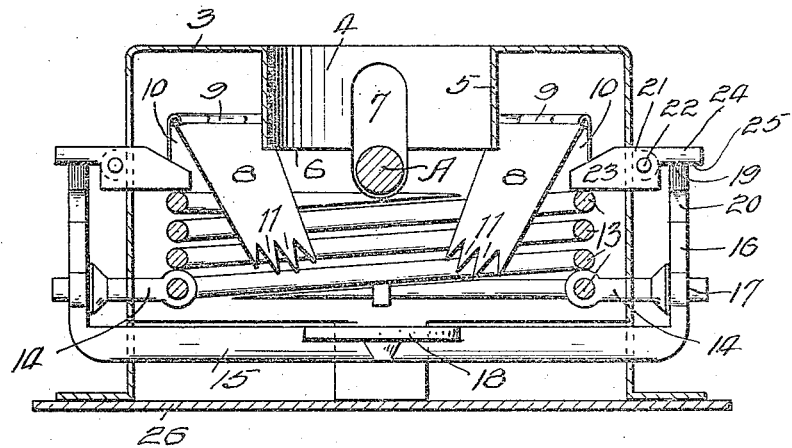
Fig. 1, is a sectional elevation of a trap constructed in accordance with my invention, the same being shown as set.

In carrying out the aim of my present invention, I employ a suitable metallic hollow case or housing 1, having suitable supporting legs 2. The top 3 of the case 1 is provided with a central opening 4 of suitable size formed within the collar 5. The collar 5 depends from the top 3 a suitable distance and the lower edge 6 thereof acts as a stop for hinged trap jaws hereinafter explained. The wall of the case 1 and the wall of the depending collar 5 are provided with suitable aligned openings 7 for the reception of a removable setting rod A to be used when setting the trap.

Figure 2:
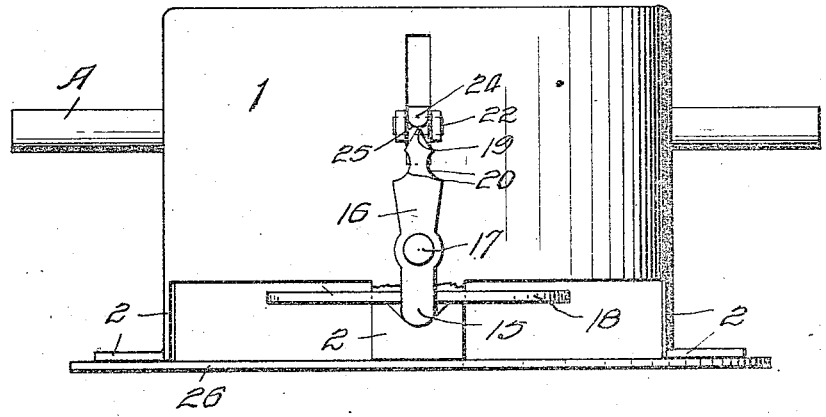
Fig. 2, is a side elevation thereof showing the trigger means.
Figure 3:
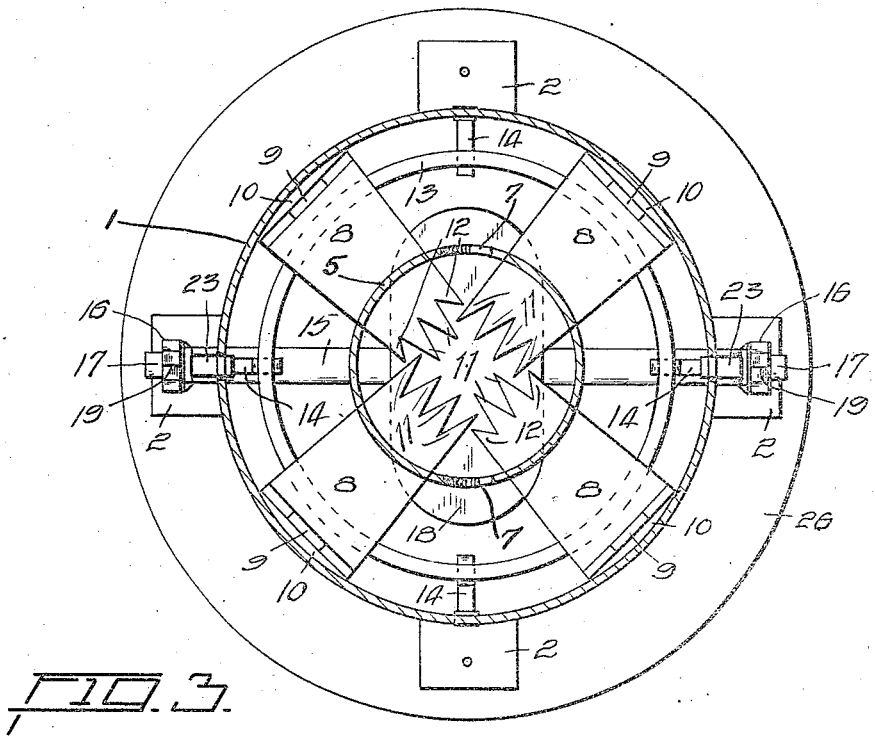
Fig. 3, is a sectional view of the trap with the jaws thereof shown as closed.

Four trap-jaws 8 are hinged, as at 9, to the hinge sections 10, which hinge sections 10 are suitably secured to the inner side of the case 1, as clearly shown in Figures 1, 2 and 3. Two of the opposed hinged trap-jaws 8 are provided with a plurality of equal length pointed teeth 11. The other two opposed hinged trap-jaws 8 are each provided with a plurality of equal length pointed teeth 11 and two outside pointed teeth 12 which are shorter than the teeth 11 to prevent the outside teeth of the several trap-jaws 8 from contacting or interlocking with one another when the trap-jaws are in their sprung or closed position, as clearly shown in Figure 3, thus permitting the points of the several long teeth 11 to come close enough together to firmly hold the leg of any animal to prevent the escape of same after the trap has been sprung.

A suitable coiled spring 13 is carried within the case 1. The lower coil of the spring is carried by suitable supports 14 to support the spring in position, as clearly shown in Figures 1 and 4. The upper coil of the spring 13 is adapted to engage the lower face of each hinged trap-jaw 8 adjacent the hinged joints when the trap is in a sprung or closed position and thereby firmly hold the trap-jaws in contact with the lower edge 6 of the collar 5, as clearly shown in Figures 3 and 4.

The trigger mechanism for the trap consists of a treadle-bar 15 having the right angular trigger-arms 16 which arms 16 are pivotally supported as at 17. The treadle-bar 15 is provided with a suitable tripper-plate 18 which may also be used to support bait. The upper end of each trigger-arm 16 is provided with a knife edge 19 and the concaved side faces 20.

A pair of suitable dogs 21 are pivotally supported to the case 1 as at 22, in opposed relation. These dogs are each provided with an inwardly extending spring engaging arm 23 and an outwardly extending trigger-arm engaging arm 24 each having the lower curved face 25.

A suitable base plate 26 is fixed to the supporting legs 2 to prevent the trap from sinking into sand or soft earth along creeks, rivers or other bodies of water.

Figure 4:
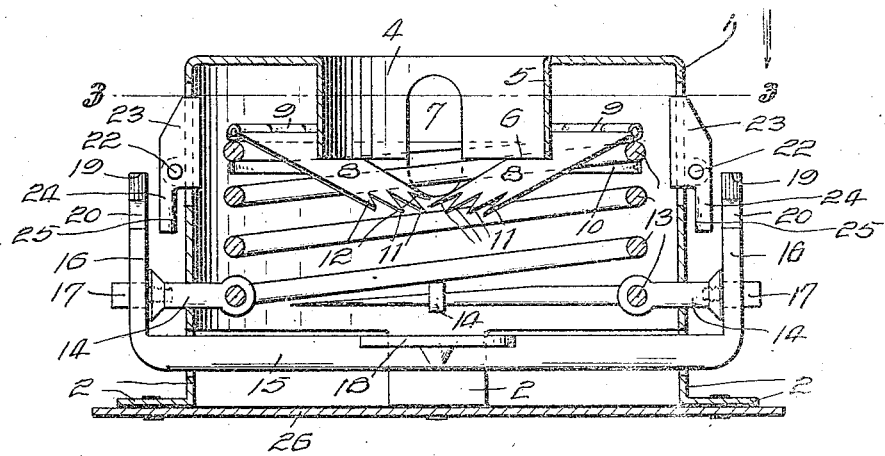
Fig. 4, is a sectional elevation thereof showing the trap as sprung, or closed.

The operation of the trap is as follows:

To set the trap from its sprung, or closed position, as shown in Figure 4, the rod A is slipped through the openings 7 and allowed to rest upon the upper coil of the spring 13, as shown in dotted lines in Figures 3 and 4. Even downward pressure is then applied to the rod a thereby compressing the coiled spring 13 from its expanded position shown in Figure 4 to the position shown in Figure 1. When the spring 13 has been compressed sufficiently, the dogs are then lifted from the position shown in Figure 4 and placed into the position shown in Figure 1, with the arms 23 into engagement with the upper coil of the spring 13 and the curved part 25 of arms 24 resting upon the knife edge 19 of the trigger-arms 16. When the dogs 21 have been properly set, the rod A can then be removed and the trap-jaws 8 pushed downward with the fingers until they assume a position, as shown in Figure 1. Bait may then be placed upon the treadle-bar plate 18 and the trap placed or hidden where-ever desired.

To spring the trap all that is necessary is to have the leg of an animal pass through the opening 4 and exert slight pressure upon the treadle-bar plate 18 which is directly below the opening 4. When pressure has been applied to the plate 18 it will cause the rod 15 to rock causing the knife edge 19 of trigger-arm 16 to disengage the face 25 of each dog 21 thereby releasing the coiled spring 13 causing it to expand or rise upwardly and cause the upper coil to engage the lower faces of trap-jaws 8 and force the jaws upwardly into the position shown in Figure 4 from the position shown in Figure 1. When the jaws 8 raise from their open position to their closed position it is obvious that the points 11 thereof will penetrate the leg of the animal and prevent the leg from being removed, excepting by a trapper.

The many advantages of the herein described invention will readily suggest themselves to those skilled in the art to which it appertains.

I do not desire to be understood as limiting myself to the details of construction and arrangement as herein described and illustrated, as it is manifest that variations and modifications may be made in the features of construction and arrangement in the adaptation of the device to various conditions of use without departing from the spirit and scope of my invention and the terms of the following claims, hence with it to be understood that I reserve the right to make any such changes or modifications as may fairly fall within the scope of the appended claims when fairly construed.

What I claim is:—

1. In a trap of the class described, comprising a hollow case having a central opening in the top thereof, hinged jaw members arranged in opposed pairs having pronged inner ends, a coiled spring supported within the case, means for compressing the spring to permit setting of the jaw-members, means for holding the spring in its compressed position, and means adapted to be stepped upon by the foot of an animal for releasing the spring from its compressed position so that it will act against the jaw-members and close them in upon and firmly engage the leg of the trapped animal until released by the trapper.

2. In a trap of the class described, comprising a case having a central opening in the top thereof, a coiled spring, spring actuated jaw-members hingedly connected to the wall of said case, means for compressing the spring to permit setting of the jaw-members, trigger mechanism for retaining the spring in its compressed position, and means for tripping the trigger mechanism for releasing the coiled spring to permit same to close the jaw-members.

3. In a trap of the class described, comprising a case having a central opening in the top thereof, a plurality of opposed pairs of hingedly supported jaw-members, a coiled spring carried within the case, supports for said spring, a treadle-bar having trigger-arms pivotally supported to said case, pivotally supported dogs having an arm for engagement with the upper end of each trigger-arm and an arm for contact with the upper coil of said spring when the jaw-members are set, means for compressing the spring to permit setting of the jaw-members, and a plate fixed to the treadle-bar directly below the central opening in the top of the case which when stepped upon by the foot of an animal will tilt the trigger-arms and release the dogs thereby permitting the coiled spring to expand upwardly and force the pronged ends of the jaw members into the leg of the trapped animal, and a stop to limit the upward movement of the hinged jaw-members.

4. In a trap of the class described, comprising a hollow case, a collar depending from the top of said case having an opening therein, a plurality of hinged trap-jaws supported by the case having their inner ends provided with a plurality of pointed prongs terminating near the center of the trap, said trap-jaws adapted to engage the lower edge of said collar when in their closed position, a coiled spring positioned below the hinged trap-jaws adapted to engage the trap-jaws and hold them in their closed position when the trap is sprung, a treadle bar having an upright trigger formed at each end thereof and each trigger having a tapered upper end, a dog pivotally supported to the case adjacent the upper end of each trigger-arm, said dogs each having an arm adapted for engagement with the tapered upper edge of each trigger-arm and an arm for engagement with the upper coil of said coiled spring when the trap is set, and a plate fixed to said treadle-bar directly below the opening in the aforesaid collar, adapted to be stepped upon by an animal for springing the trap and causing the trap-jaws to engage and hold the leg of the animal springing the trap.

In testimony whereof, I have hereunto signed my name to the specification.

MARTIN J. SVEHLA.